United States Patent
Garcia Morchon et al.

(10) Patent No.: US 10,142,838 B2
(45) Date of Patent: Nov. 27, 2018

(54) CONTEXT-AWARE CONTROLLING OF MULTIPLE SYSTEMS OF CONTROLLABLE DEVICES

(71) Applicant: PHILIPS LIGHTING HOLDING B.V., Eindhoven (NL)

(72) Inventors: Oscar Garcia Morchon, Eindhoven (NL); Fulong Ma, Eindhoven (NL); Sahil Sharma, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 167 days.

(21) Appl. No.: 15/501,404

(22) PCT Filed: Jul. 21, 2015

(86) PCT No.: PCT/EP2015/066591
§ 371 (c)(1),
(2) Date: Feb. 2, 2017

(87) PCT Pub. No.: WO2016/020182
PCT Pub. Date: Feb. 11, 2016

(65) Prior Publication Data
US 2017/0238176 A1    Aug. 17, 2017

(30) Foreign Application Priority Data
Aug. 5, 2014   (EP) .................................... 14179868

(51) Int. Cl.
*H04L 12/06*        (2006.01)
*H04W 12/06*        (2009.01)
(Continued)

(52) U.S. Cl.
CPC ......... *H04W 12/06* (2013.01); *H04L 12/2816* (2013.01); *H04W 4/04* (2013.01);
(Continued)

(58) Field of Classification Search
CPC .. H04W 12/06; H04W 12/08; H04L 12/2816; H05B 37/0272; H05B 37/0245
See application file for complete search history.

(56) References Cited

U.S. PATENT DOCUMENTS

| | | |
|---|---|---|
| 2004/0163073 A1 | 8/2004 | Krzyzanowski et al. |
| 2012/0169461 A1 | 7/2012 | Dubois, Jr. |

(Continued)

FOREIGN PATENT DOCUMENTS

| | | |
|---|---|---|
| WO | WO2012085794 A1 | 6/2012 |
| WO | WO2013108167 A1 | 7/2013 |
| WO | WO2014060920 A | 4/2014 |

OTHER PUBLICATIONS

J-Y Tigli, et al., "Context-Aware Authorization in Highly Dynamic Environments", International Journal of Computer Science Issues, vol. 4, No. 1, 2009, pp. 24-35.

(Continued)

*Primary Examiner* — Beemnet W Dada (57) ABSTRACT

The invention relates to a method for enabling a controller configured for controlling devices of a first system via a first backend to control devices of a second system via a second backend. The method, performed by the second backend, includes receiving, from the first backend, location information of the controller and credentials of the controller or/and of a user of the controller, receiving, from a source trusted by the second backend, location information of the controller and credentials of the controller or/and of the user, and performing context matching to enable the controller to control the devices of the second system by comparing the location information received from the first backend with the location information received from the source trusted by the second backend and by comparing the credentials received (Continued)

from the first backend with the credentials received from the source trusted by the second backend.

16 Claims, 6 Drawing Sheets

(51) Int. Cl.
    *H04W 4/04*         (2009.01)
    *H05B 37/02*        (2006.01)
    *H04L 12/28*        (2006.01)
    *H04W 12/08*       (2009.01)

(52) U.S. Cl.
    CPC ........... *H04W 4/043* (2013.01); *H04W 12/08* (2013.01); *H05B 37/0245* (2013.01); *H05B 37/0272* (2013.01)

(56) References Cited

U.S. PATENT DOCUMENTS

| | | | |
|---|---|---|---|
| 2012/0290434 A1 | 11/2012 | Moritz et al. | |
| 2013/0198814 A1* | 8/2013 | Zheng | H04W 12/06 726/4 |
| 2013/0238456 A1* | 9/2013 | Soysa | G06Q 20/327 705/21 |
| 2016/0316363 A1* | 10/2016 | Li | H04W 12/04 |
| 2016/0358108 A1* | 12/2016 | Sadovsky | G06Q 10/02 |
| 2017/0243417 A1* | 8/2017 | Manikantan Shila | H04W 12/06 |

OTHER PUBLICATIONS

A. Tripathy, et al., "Context-Based Secure Resource Access in Pervasive Computing Environment", IEEE Pervasive Computing 1 (3): 33-40, Jul./Sep. 2002.

* cited by examiner

CONTEXT-AWARE CONTROLLING OF MULTIPLE SYSTEMS OF CONTROLLABLE DEVICES

CROSS-REFERENCE TO PRIOR APPLICATIONS

This application is the U.S. National Phase application under 35 U.S.C. § 371 of International Application No. PCT/EP2015/066591, filed on Jul. 21, 2015, which claims the benefit of European Patent Application No. 14179868.6, filed on Aug. 5, 2014. These applications are hereby incorporated by reference herein.

BACKGROUND OF THE INVENTION

Embodiments of the present invention relate generally to the field of systems comprising controllable devices, in particular lighting systems comprising controllable light sources, and, more specifically, to systems and methods for context-aware controlling of a plurality of such systems.

DESCRIPTION OF THE RELATED ART

Control of systems comprising multiple controllable devices is evolving to be more and more networked and intelligent. For example, a controller of a lighting system may have different working modes and save energy by e.g. dimming down certain light sources in certain circumstances, or the controller and the light sources may use preinstalled keys to communicate securely.

Some of these control systems leverage functionality present in mobile devices. US2012/169461A1 for example discloses an electronic physical access control system with remote authentication. The system has an authorizing device, such as a cellular telephone, and a mechanism for receiving information related to a particular facility and the user's access rights based on the location of the authorizing device. The authorizing device is placed in proximity to a secured portal. The user is required to authenticate theirself to the authorizing device. The authorizing device then sends a signal to a locking device associated with the secured portal.

Figure 1:
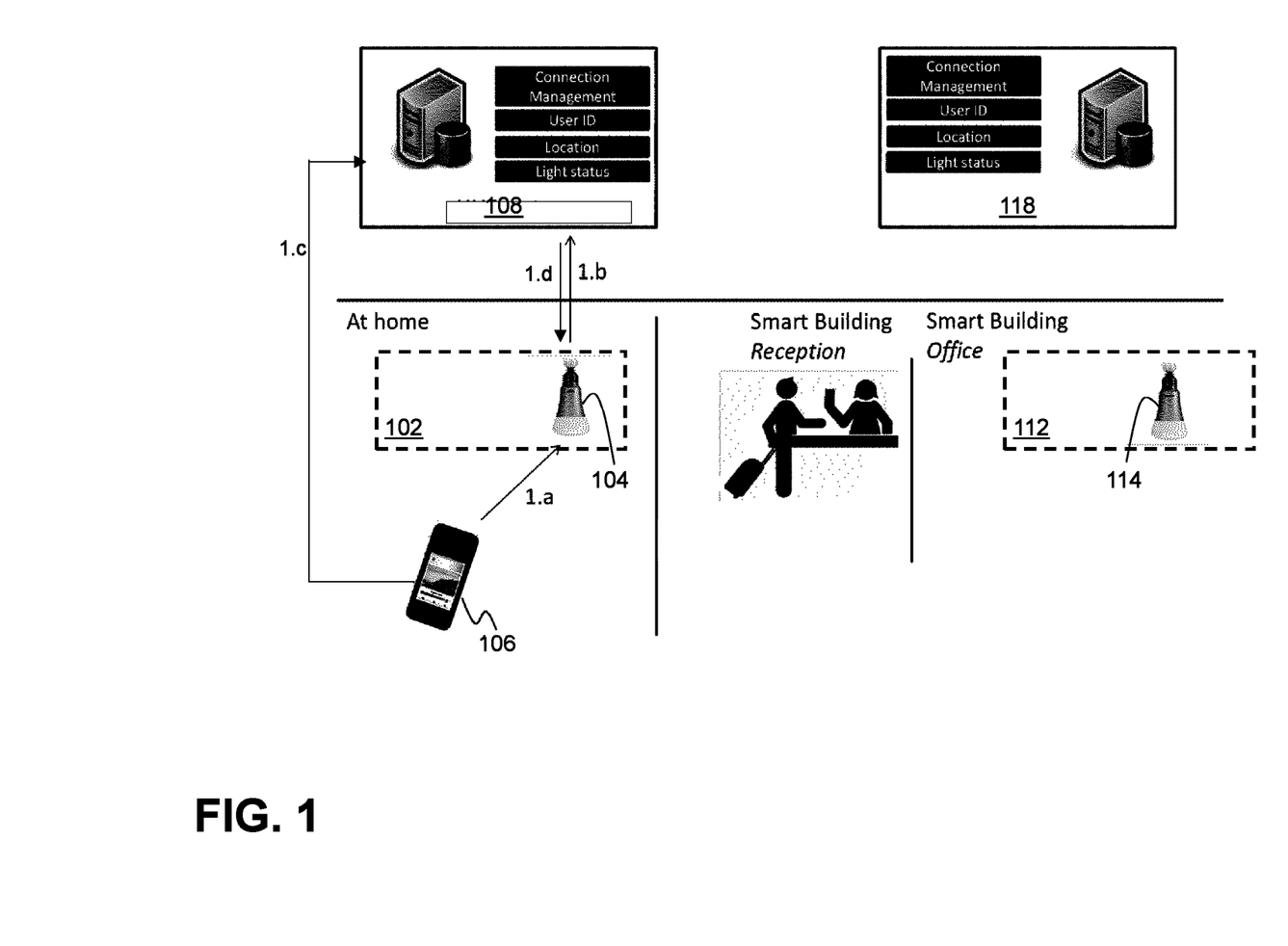
FIG. 1 is a schematic illustration of two systems, each comprising one or more controllable devices.

With the fast growing of intelligent mobile devices such as smart phones, tablet PCs, etc., it is a natural intention to control the controllable devices of such systems from mobile devices. FIG. 1 is a schematic illustration of a first system 102 comprising one or more controllable devices 104, e.g. light sources in a home, being controlled by a controller 106 as is currently done in the art. The one or more controllable devices 104 are communicatively connected to a first backend 108 that may include and manages information related to the controllers 106 and/or their users as well as information related to the controllable devices of the first system.

A user may control the controllable device 104 by providing user input to the controller 106, the controller 106 being e.g. a mobile phone of the user, which then controls the device 104 in one of the two manners. If the controller 106 and the device 104 are in the same local area network (e.g. that of user's home), then the controller 106 may provide a control command representative of user's input to the device 104 directly, e.g. via a WiFi connection, as shown in FIG. 1 with step 1.a. After that, the device 104 or the first system 102 may provide an indication of the new status of the device 104 to the first backend 108, as shown in FIG. 1 with step 1.b. If the controller 106 and the device 104 are not in the same local area network, then the controller 106 may provide the control command first to the first backend 108, shown as step 1.c in FIG. 1, which, in turn, provides the command to the controllable device 104, shown as step 1.d in FIG. 1.

The right side of FIG. 1 illustrates the user arriving at an infrastructure where another system of controllable devices may be installed, shown as system 112 comprising one or more controllable devices 114, e.g. a lighting system comprising light sources in a smart building that a user may visit. Current architectures only work with controllers managed by the IT department, via the dedicated backend 118. Therefore, if at all possible, it is not easy to enable the user to use his smart phone 106 to control the devices 114 of the second system and requires involvement of the IT department overseeing the system 112 and 118. This significantly limits the flexibility of the system.

What is needed in the art is an approach that enables a controller that is typically used for controlling the controllable devices of one system to control the controllable devices of another system in a manner that is both convenient and secure.

SUMMARY OF THE INVENTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

To reduce or eliminate at least some of the problems discussed above, according to one aspect of an embodiment of the present invention, a computer-implemented method that enables a controller configured for controlling one or more controllable devices of a first system via a first control system backend to control one or more controllable devices of a second system via a second control system backend is disclosed. The method includes a step of receiving, at the second control system backend, from the first control system backend, location information of the controller and credentials of the controller or/and of a user of the controller as available to (i.e., as registered with) the first control system backend, the location information indicating that the controller/user is within an infrastructure in which the one or more devices of the second system are deployed. The method also includes a step of receiving, at the second control system backend, from a source trusted by the second control system backend, location information of the controller or of the user of the controller (which would be considered indicative of the location of the controller itself) and credentials of the controller or/and of the user as available to the trusted source. The method further includes a step of performing, at the second control system backend, context matching to enable the controller to control the one or more devices of the second system, where the context matching comprises comparing the location information received from the first control system backend with the location information received from the source trusted by the second control system backend and by comparing the credentials received from the first control system backend with the credentials received from the source trusted by the second control system backend.

In an embodiment, each of at least some, but preferably all, of the controllable devices could comprise/be a component of a lighting system (i.e., of any kind of an illumination infrastructure), such as a lighting source, or a plurality of such components light sources. In such a case, the first and second systems could be referred to, respectively, as first and second lighting systems. In such an embodiment, at least some of the devices of the first and/or second lighting systems could be configured to transmit data (e.g. their unique IDs) embedded into their light output as e.g. a series of modulations in amplitude or phase of the light signal, a technique sometimes referred to as "coded light" (CL).

A CL system is a dual purpose system in that it performs two functions; i.e. illumination and data transmission. The data transmitted can be a unique identifier (ID). This ID in turn could be used to identify the light source to the controller in order to allow the controller to control that specific light source. One advantage of using a CL system is that the data is available only when the light in which the data is embedded is visible; i.e. it is localized, quite often even localized to individual rooms. CL thus can be used for fine grained control, but also for localization. For example when using a controller in the form of a mobile phone that is capable of receiving CL, then the mobile phone can receive the unique identifier embedded in the light, and can subsequently use this ID to locate the approximate spatial position of the light source (and thus the approximate spatial position of the controller) in a database. This database can be a local database in the mobile phone or alternatively can be a backend specific database. Although certain forms of CL require dedicated CL receivers, other forms of CL can be received using the built-in camera of devices such as smartphone and/or tablets (see e.g. WO2013108167).

In an embodiment, the location information of the controller could comprise GPS coordinates of the controller. Such GPS coordinates could be obtained e.g. by means of a GPS sensor of the controller or by triangulation with surrounding base stations, in case the controller is a cellular phone or any other device connected to a wireless cellular network. Alternatively, if a CL system is used that has as its primary function not control, but rather provisioning of location information, the CL system could be configured to transmit location information directly (optionally concatenated to a unique device identifier in the event that both control and provisioning of location information is required).

In one embodiment, the trusted source could comprise an application that determines access rights of the user with respect to controlling the one or more devices of the second system. In such an embodiment, the location information received by the second backend from the trusted source could comprise GPS coordinates, a location specific ID, which could be derived e.g. from CL emitted by the controllable light sources of the second system, or a combination of these two types of location information, while the credentials could comprise a user name or an identification of the controller, possibly in combination with the user name password. Additionally or alternatively, the credentials received by the second backend from the trusted source could comprise information such as e.g. access rights as determined by the application and/or biometric attributes of the user.

In another embodiment, a near field communication (NFC) reader installed at a building could be used as the trusted source providing the location information and the credentials to the second backend.

In yet another embodiment, the trusted source could comprise a device configured to receive input entered by a receptionist or an administrator of the second system and/or of the second backend. In such an embodiment, the location information received by the second backend from the trusted source could comprise GPS coordinates, a location specific ID, which, e.g., again, could be derived from CL, a location ID based on the IP address of the computing device used by the receptionist, or any combination of these three types of location information, while the credentials could comprise a user name or an identification of the controller or of the user, possibly in combination with the user name password, and/or biometric attributes of the user. Since a receptionist or an administrator (i.e., a human) is involved, credentials could also be based on a valid driving license/passport that the user presents in order for the receptionist or the administrator to validate the identity of the user.

Embodiments of the present invention are based on the recognition that providing the location information and credentials of the controller from the first backend enables the second backend to perform context matching with the location information and credentials of the controller provided by a trusted source, which, in turn, empowers users and visitors of the second system to control the controllable devices of the second system in a secure manner using the same controller that they use to control the controllable devices of the first system.

In an embodiment, the step of enabling the controller to control the one or more devices of the second system comprises establishing access rights for the controller, the access rights identifying which devices of the one or more devices of the second system the controller is allowed to control and, optionally, which actions the controller is allowed to take in controlling the one or more devices of the second system. This embodiment provides the advantage of fine grained access control based on, for instance, the role of the identified user in a role based access control system.

In one further embodiment, the step of enabling the controller of the user to control the one or more devices of the second system comprises establishing an access or a validity period, the access period identifying one or more time periods during which the controller is allowed to control the one or more devices of the second system. This embodiment may provide the advantage of having equal rights for all users, but for a limited period of time, ensuring safety of the system. This embodiment may be particularly advantageously combined with the one previously described to provide for role based access control for a limited duration.

In various embodiments, the access rights and/or the access period may be established in accordance with a status of the user within an infrastructure in which the second system is deployed. For example, the status could indicate that the user is either en employee working in a building in which the second system is deployed or that the user is a visitor of that building.

In an embodiment, the computer-implemented method may further include receiving, at the second backend, from the first backend, a control command to control the one or more devices of the second system, determining, by the second backend, whether the user is within an infrastructure in which the second system is deployed, determining, by the second backend, whether the control command is allowed according to the outcome of the context matching and access control rules, and, upon positive determinations, the second backend providing the control command, or a derivative thereof, to the one or more devices of the second system. This embodiment provides the advantage of allowing control of the second backend by using the first backend as a proxy, which is especially useful when access credentials, such as keying material, etc. for the second backend, have not been provided to the controller and, therefore, the controller cannot directly communicate with the second backend securely.

In an embodiment referred to herein as an "access credentials transfer embodiment", the computer-implemented method may further include providing, from the second backend, to the first backend, access credentials advantageously enabling the controller to securely provide one or more control commands to the second backend directly (i.e., without the involvement of the first backend), the one or more control commands being one or more commands for controlling the one or more devices of the second system. In an embodiment, the access credentials may comprise information enabling authentication of the controller with the second backend and/or enabling the controller to encrypt the control commands sent to the second backend, such as e.g. one or more of authentication certificates or keys and one or more of encryption keys. Alternatively or additionally, the access credentials may comprise an address at which the controller can reach the second backend, such as e.g. IP address or a URL of the second backend.

In one further embodiment of the access credentials transfer embodiment, the method may further include providing, from the second backend, to the first backend, information enabling the controller to identify and/or individually address the one or more devices of the second system. In case the first and second systems are lighting systems where the devices are CL-enabled light sources, such information could comprise information that would allow the controller to detect CL emitted by the light sources of the second system, such as e.g. an indication of the modulation scheme used to emit CL, an indication of the format of the CL emitted by the different light sources, an indication of when the light sources will be emitting CL, etc.

In another further embodiment of the access credentials transfer embodiment, the method may further include receiving, at the second backend, from the controller, a control command to control the one or more devices of the second system, determining, by the second backend, whether the control command is in accordance with the access credentials provided by the second backend to the first backend, and, upon positive determination, the second backend providing the control command, or a derivative thereof, to the one or more devices of the second system. This embodiment provides the advantage of enabling the controller to control the devices of the second system directly by securely communicating with the second backend, thereby reducing the delays involved with communicating with the first backend and then the first backend issuing the command to the second backend.

According to another aspect of the present invention, a second backend configured to perform the method steps described above is disclosed.

According to yet another aspect of the present invention, a first backend for use in the methods described herein is disclosed. The first backend is configured at least to receive, from the controller, the location information of the controller, where, preferably, the location information comprises GPS coordinates of the controller, and provide, to the second backend, the local information of the controller and credentials of the user of the controller.

In an embodiment, the provision of the location information to the second backend enables the controller to provide the control command to control the one or more devices of the second system to the first backend and the first backend may be further configured to receive, from the controller, a control command to control the one or more devices of the second system, determine whether the location information received from the controller indicates that the controller is within the infrastructure in which the second system is deployed, and, upon positive determination, provide, to the second backend, the control command received from the controller. Such an embodiment provides the advantage that the control commands for controlling the devices of the second system go via the first backend which assists with the verification that the controller is indeed within the infrastructure in which the second system is deployed and, therefore, can control the devices of the second system.

Alternatively, in the access credentials transfer embodiment, the provision of the location information to the second backend enables the controller to provide the control command to control the one or more devices of the second system to the second backend and the first backend is further configured to receive, from the second backend, access credentials enabling the controller to securely provide one or more control commands to the second backend, the one or more control commands being one or more commands for controlling the one or more devices of the second system, and provide the access credentials received from the second backend to the controller. Such an embodiment provides the advantage that, once the first backend has forwarded the access credentials to the controller, the controller is able to provide the control commands for controlling the devices of the second system directly to the second backend, without the involvement of the first backend.

In one further embodiment, the first backend may further be configured to receive, from the second backend, information enabling the controller to identify and/or individually address the one or more devices of the second system, and provide the information received from the second backend to the controller. Such an embodiments provides the advantage of allowing the controller to correctly interpret information, such as the information/code/data contained in the data obtained from the CL.

In yet another aspect of the present invention, a controller for use in the methods described herein is disclosed. The controller includes one or more processors configured to control, via the first backend, the one or more devices of the first system, provide the location information of the controller to the first backend, and provide the control command to control the one or more devices of the second system. Preferably, the location information comprises GPS coordinates of the controller as e.g. detected by a GPS sensor of the controller or, when the controller comprises a mobile device connected to a wireless cellular network, determined by triangulation with surrounding base stations of the wireless cellular network. In the access credentials transfer embodiment, provision of the location information enables the controller to provide the control command to control the one or more devices of the second system directly to the second backend because, in such an embodiment, the controller is further configured to receive, from the first backend, access credentials enabling the controller to securely provide one or more control commands to the second backend, the one or more control commands being one or more commands for controlling the one or more devices of the second system.

In other embodiments, provision of the location information enables the controller to provide the control command to control the one or more devices of the second system to the first backend, which then passes the control commands to the second backend, subject to further verification by the first backend and/or the second backend.

In various embodiments, such a controller is preferably a portable electronic device such as a mobile (smart) phone or a tablet computer. Besides comprising the one or more processors, such a controller would further include components typically included in portable electronic devices such as a display, a memory, wireless receivers/transmitters, etc.

The memory of the portable electronic device may store one or more programs configured to be executed by the one or more processors of the controller. The one or more programs include instructions for carrying out any of the method steps performed by the controller described herein. In various embodiments, the one or more processors may be implemented in hardware, in software, or as a hybrid solution having both hardware and software components.

In an embodiment, the display of the portable electronic device may comprise a touch sensitive display, also sometimes referred to as a "touch screen display" or simply "touch screen". In such an embodiment, user may provide user inputs to the controller by means of a movement of a physical object, such as e.g. a finger of the user or a stylus, on or near the touch screen display. In other embodiments, user may provide user inputs to the controller by other means, e.g. by means of a peripheral device such as a keyboard or a mouse.

In another aspect of the present invention, a system comprising two or more of the second backend, the first backend, the controller, the first system (comprising one or more controllable devices), and the second system (comprising one or more controllable devices) is also provided.

Moreover, computer programs (products) for carrying out the methods described herein, as well as computer readable storage-media (CRM) storing the computer programs are provided. A computer program for performing steps carried out by the controller may, for example, be downloaded (updated) to the existing portable electronic devices (e.g. to the existing remote controls, smart phones, or tablet computers) to configure them to control the controllable devices of the first and second systems as described herein, or be stored upon manufacturing of these devices. Preferably, the CRM comprises a non-transitory CRM.

Hereinafter, embodiments of the invention will be described in further detail. It should be appreciated, however, that these embodiments may not be construed as limiting the scope of protection for the present invention.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 2A:
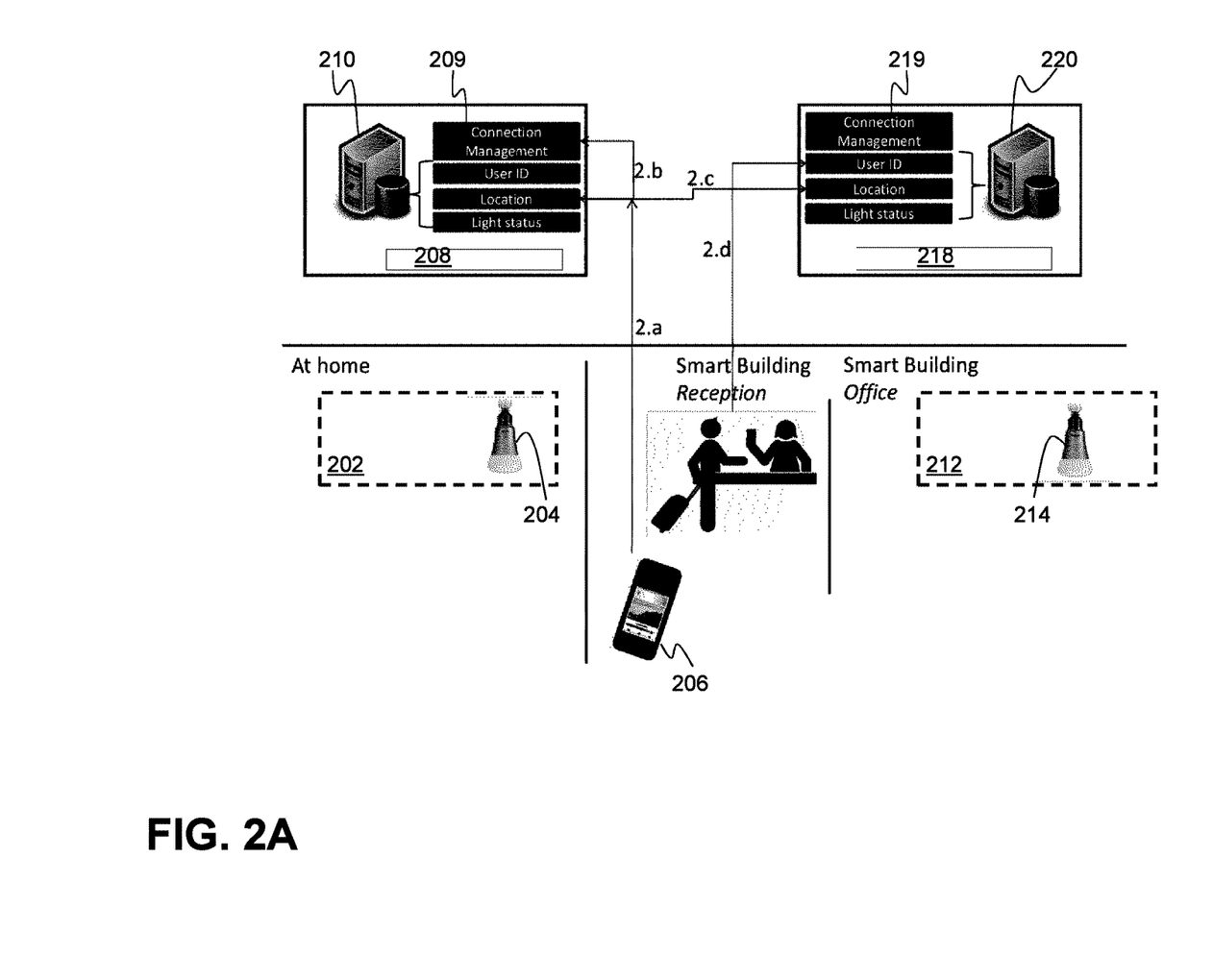
FIG. 2A is a schematic illustration of enabling a controller configured for controlling one or more controllable devices of a first system to control one or more controllable devices of a second system, according to one embodiment of the present invention.

FIG. 2A is a schematic illustration of enabling a controller 206 configured for controlling one or more controllable devices 204 of a first system 202 to control one or more controllable devices 214 of a second system 212, according to one embodiment of the present invention.

While the devices 204 and devices 214 could comprise any type of devices which may need to be controlled, such as e.g. components of a home automation system, a building automation system, a HVAC system or components of a security/fire alarm system, in the illustrative embodiment shown in FIG. 2A, the system 202 and 212 are shown as illumination systems comprising light sources or luminaires 204 and 214, respectively (shown in FIG. 2A with one light source 204 in the system 202 and one light source 214 in the system 212). Of course, in other embodiments, each of the systems 202 and 212 could comprise any number of controllable devices, which devices could be placed at different places within the structure. The light sources 204 and 214 may comprise any suitable sources of light such as e.g. high/low pressure gas discharge sources, laser diodes, inorganic/organic light emitting diodes, incandescent sources, or halogen sources. During operation, the light output provided by the light sources 204 and 214 contribute to the total illumination provided by the illumination systems 202 and 212.

Similarly, while FIG. 2A illustrates that the first system 202 is deployed at a home, e.g. at a home of the user of the controller 206, and the second system 212 is deployed in an office of a smart building, embodiments of the present invention are not limited to such deployment scenarios and are applicable for the first and second systems being deployed in any configuration and at any location(s).

The one or more controllable devices 204 are communicatively connected to a first backend 208, while the one or more controllable devices 214 are communicatively connected to a second backend 218. As used herein, the term "backend", in context of the first backend 208 and the second backend 218, is used to describe an entity implemented in hardware, in software or a combination thereof. It may even describe a virtual entity whose functionality is implemented in software and located in a web cloud, that can act as a type of a site controller of an automation system, e.g. of a home or a building automation system. In particular, the first backend 208 is responsible for carrying out management of the connections between the controller 206 and the controllable devices 204 of the first system 202, shown in FIG. 2A with an element 209 representing "Connection management". Typically, the first backend 208 performs connection management with respect to multiple controllers (not shown in FIG. 2A) such as the controller 206 and multiple systems (not shown in FIG. 2A) of controllable devices such as the first system 202 of the devices 204.

In order to be able to perform connection management, the first backend 208 includes or otherwise has access to a database 210 which may store information such as credentials of the controller 206 and/or of the user of the controller 206, shown in FIG. 2A as an entry "User ID", and location information of the controller 206, shown in FIG. 2A as an entry "Location". In various embodiments, the credentials of the controller 206 and/or of the user of the controller 206 could include e.g. a user ID, an email address of the user, or a unique ID of the controller. The location information could include GPS coordinates as obtained e.g. by the GPS sensor which may be included within the controller 206 or, in case the controller 206 is a mobile phone connected to a wireless cellular network, by triangulation with the neighboring base stations within the tracking area of the phone (i.e., the area covered by the base stations to which the phone could connect).

Optionally, the database 210 could also store information indicative of the status of the controllable devices 204 of the first system 202, shown in FIG. 2A as an entry "Light status". The light status for the light sources 204 could include e.g. information regarding the dimming level, the color temperature, or any other parameters of the light sources individually or/and the lighting system 202 in general.

The implementation of the connection management 209, typically as a computer program that is responsible for the functions associated with connection management, could result an entry, or multiple entries, in the database 210 containing information indicative of the existing, former, and/or future connections between the controller 206 and the devices of the first system 202. The controller 206 may be configured to control the devices 204 of the first system 202 as described above for FIG. 1, where elements 1XX depicted and described for FIG. 1 are analogous to elements 2XX depicted and described for FIG. 2A.

In addition, since, as described in greater detail below, according to the embodiments of the present invention the first backend 208 is also responsible for assisting in creating and/or managing connections between the controller 206 and the controllable devices 214 of the second system 212, the connection management 209 entry in the database 210 could include information indicative of the existing, former, and/or future connections between the controller 206 and the devices of the second system 212. Furthermore, in order to be able to assist in creation and management of connections between the controller 206 and the controllable devices 214 of the second system 212, the first backend 208 has access to information that allows the first backend 208 to send communications to the second backend 218. Such information could include e.g. an IP address or a URL of the second backend 218 and could be stored e.g. in the connection management 209 entry in the database 210. This communication is secure and would possibly involve setting up of a secure channel between 208 and 218, possibly managed by 209 and 219.

Similar to the first system, the second backend 218 is responsible for carrying out management of the connections between some kind of a controller (not shown in FIG. 2A), or multiple controllers (not shown in FIG. 2A), and the controllable devices 214 of the second system 202, shown in FIG. 2A with an element 219 representing "Connection management", typically implemented as a computer program and possibly associated entries within the database of the second backend 218.

Since, as described in greater detail below, according to the embodiments of the present invention the second backend 218 is also responsible for creating and/or managing connections between the controller 206 of the first system 202 and the controllable devices 214 of the second system 212, the connection management 219 of the second backend 218 could include information indicative of the existing, former, and/or future connections between the controller 206 and the devices of the second system 212.

Similar to the first backend 208, in order to be able to perform connection management, the second backend 218 may include or otherwise have access to a database 220 which may store information such as credentials of the controller 206 and/or of the user of the controller 206, shown in FIG. 2A as an entry "User ID" and location information of the controller 206 and/or of the user of the controller, shown in FIG. 2A as an entry "Location".

Optionally, the database 210 could store information indicative of the status of the controllable devices 214 of the second system 212, shown in FIG. 2A as an entry "Light status". The light status for the light sources 214 could include e.g. dimming level, CL parameters, etc. The connection management 219 could be implemented, at least in part, as an entry in the database 220 containing information indicative of the existing, former, and/or future connections between the controller 206 and the devices of the second system 212.

In an embodiment, each of the controllable devices 204 and 214 could be assigned a unique identification, e.g. a network address of the device. Assigning a unique ID to each of the devices 204 and 214 allows the devices to be individually identifiable within their respective systems 202 and 212. The unique IDs could comprise system-unique addresses, such as e.g. MAC addresses of the devices, or unique identifiers associated with device types and subtypes, such as e.g. numbered downlighters versus wall washers.

In an embodiment, each of the controllable devices 204 and 214 could be configured to transmit an identification signal comprising the unique ID of the device, e.g. by means of CL, by other means of (ultra)sound signals, or by means of RF links (e.g. 802.11 or Zigbee). The identification signals transmitted by the devices 204 and 214 would allow the controller 206 to perform automatic discovering of the controllable devices present in the first and second systems, as is known in the art.

While each of the databases 210 and 220 are shown in FIG. 2A as single units, in other embodiments, the databases 210 and 220 could be implemented across multiple databases.

FIG. 2A illustrates a situation in which a user of the controller 206 moves to a smart building where the second system 212 is deployed. In this location, the user would like to control the controllable devices of the second system 212, e.g. light sources, with the same controller 206 that the user uses to control the controllable devices of the first system 202. The building owner or manager would also like to empower the user to control the lighting system 212 in the most convenient way while limiting the number of actions that the user or the receptionist/administrator of the building has to carry out in order to enable the user to do so. FIG. 2A illustrates how the controller 206 can be enabled to control the devices 214.

As shown in FIG. 2A with step 2.a, first the controller 206 provides its' location to the first backend 208, the location indicating that the controller 206 is within the area in which it could control the devices 214. This may happen e.g. as the user enters or approaches the building where the second system 212 is deployed. In one embodiment, the user could initiate that the controller 206 provides its' location to the first backend, e.g. by means of providing user input to that effect to the app running on its' mobile phone (i.e., the controller 206 is a mobile phone of the user with the corresponding app), the app being a set of computer instructions for controlling the devices 204 and the devices 214. In another embodiment, provision of such location information could be done automatically, e.g. by configuring the controller 206 to determine when the location of the controller is such that the controller could control the devices 214 and to automatically provide an indication of such determination to the first backend 208. This automatic provisioning could be done on the basis of GPS coordinates that uniquely identify a location or on the basis of unique identifiers associated with sites, such as locations of NFC readers, signal strength of 802.11 access points (if sufficiently fine-grained), or combinations thereof.

In one embodiment, provision of the location information indicating that the controller 206 is within the area in which it could control the devices of the second system 212 may serve as a trigger for a connection management update, shown with step 2.b. In embodiments, step 2.b may be triggered by a user or by some other events, such as e.g. a location update on an app, identification of the IP address that the controller 206 connects from, data being read from CL, or any combination of these events.

As a result of the connection management update, the first backend 208 can notify the second backend 218 that the controller 206 is in the location where the second system 212 is deployed, shown in FIG. 2A with step 2.c.

Around about the same time that the second backend 218 receives the notification of step 2.c from the first backend 208, the second backend 218 receives location information and credentials for the controller 206 or the user of the controller from a source with which the second backend 218 has a trusted relationship, one illustration of which is shown in FIG. 2A with step 2.d. The location information in this case could be e.g. in the form of an indication that the user is in the building where the second system 212 is deployed, e.g. as a result of a receptionist at that building entering the credentials of the user into a computing device of the receptionist. The location information provided to the second backend 218 in step 2.d could include e.g. GPS coordinates, a location specific ID, or/and a location ID based on the IP address of the computing device used by the receptionist. The credentials provided to the second backend in step 2.d could include a simple user name or an identification of the controller 206 or of the user, possibly in combination with the user name password, and/or biometric attributes of the user. When a receptionist is involved, credentials could also be based on a valid driving license, passport, or other form of identification that the user presents to the receptionist in order for the receptionist to validate the identity of the user.

In other embodiments, the trusted source could comprise an application that determines access rights of the user with respect to controlling the devices 214 of the second system 212. In such an embodiment, the location information received by the second backend 218 in step 2.d could comprise GPS coordinates, a location specific ID, which could be derived e.g. from CL emitted by the devices 214, or a combination of these two types of location information, e.g. to ensure uniqueness of location if CL IDs are not long enough. The credentials provided to the second backend 218 in step 2.d in such a case could include a simple user name or an identification of the controller 206, possibly in combination with the user name password. Furthermore, the credentials provided to the second backend 218 in step 2.d could include information such as e.g. access rights as determined by the application and/or biometric attributes of the user (since these may be used in buildings).

In one further embodiment, an NFC reader installed at a building could be used as the trusted source providing the location information and the credentials to the second backend 218. Such an NFC reader (not shown in FIG. 2A) could be used to e.g. read the device-specific (i.e., unique) ID of the controller 206 to identify the controller and provide this information to the second backend 218. The NFC reading procedure could be followed by prompting the user to provide a user name and/or user password, e.g. using a GUI of the controller 206 in order to authenticate the user. The location ID of the NFC reader could be used to ensure by the second backend 218 that the user is in the location specified by the location ID of the NFC. Thus, such an NFC reader could be used as an alternative way to ascertain location and provide credentials to the second backend 218 in step 2.d.

In yet other embodiments, the location information and credentials of the user or of the controller 206 provided to the second backend 218 in step 2.d could include any combination of different types of information described above as provided by the receptionist and as provided by means that don't involve a human, such as e.g. by an application or an NFC reader, and could be provided to the second backend 218 from different trusted sources (e.g. the credentials are provided as entered by the receptionist or determined by the application while the location information is provided as determined by the NFC reader). Thus, step 2.d illustrated in FIG. 2A as coming from the receptionist is not limited to only such implementation, but is intended to illustrate any kind of provision of the location information and credentials to the second backend 218 from any trusted source or a combination of such trusted sources.

Based on the credentials and location information obtained from the trusted source (step 2.d) and those obtained from the first backend 208 (step 2.c), context matching carried out by the second backend can make the link to the user using the controller 206 of the first system, thereby enabling user to use the controller 206 to control the devices 214 of the second system. In other words, with the information of steps 2.c and 2.d, the second backend 218 can perform context matching validating the controller 206 in the new environment (i.e., in the environment of the second system 212).

Context matching carried out by the second backend 218 includes comparing the current location and credentials of the user as delivered by the first backend 208 and those received from the trusted source. The user credentials may be used to not only verify, but also to simply link the location information provided by the first backend 208 with the location information obtained from the trusted source, e.g. by establishing that the user managing the controller 206 is the same one that just registered in the smart building. Context matching essentially establishes the link of the <user identity, location> in system 208 and 218 and verifies that user is indeed the user s/he/it claims to be and is in the location s/he/it claims to be in.

The location information and the credentials provided to the second backend from the first backend and from the trusted source need not be in the same format. If not in the same format, then the second backend could be configured to accommodate a mapping of either the format of the first backend to the format of the trusted source or the other way around, or mapping of both formats to yet another format, as suitable for comparison during the context matching.

As a result of context matching, the controller 206 is enabled, by the second backend 218, to control one or more of devices 214, which could be done e.g. as explained below in association with FIGS. 3A and 3B.

As a part of, or as a result of context matching, in an embodiment, the second backend 218 could assign some access rights to the user, identifying which ones of the devices 214 of the second system 212 the controller 206 is allowed to control and, optionally, which actions the controller 206 is allowed to take in controlling those devices. For example, the controller 206 of a particular user could be assigned access rights indicating that the user is allowed to dim all of the lights to a certain extent, but not turn them off completely, or indicating that the user is allowed to perform any actions with respect to one group of devices within the plurality of the devices 214 (e.g. the controller may be used to turn on/off, dim, etc. the lights in the offices of the building in which the second system 212 is installed), but only a limited number of actions with respect to another group of devices within the plurality of the devices 214 (e.g. the controller may be used to only turn on the lights in the hallways of the building in which the second system 212 is installed).

In an embodiment, access rights could be established/assigned according to the status of the user in the smart building where the second system 212 is deployed. For instance, if the user is a visitor or an employee of the company usually working in another location, then the user can be allowed to use the illumination of a shared desk and, therefore, the controller 206 is allowed to control the device 214 responsible for this illumination. On the other hand, if the user is a customer, then the user may only be allowed to control the lights 214 of the meeting room in which the user will be located.

In an embodiment, access rights may be based upon the user identity. For instance, the user, based on his identity, may be allocated a certain role which has certain permissions that are associated with that role. If the role, based on the user identity, cannot be established, the user may be accorded a default role, such as a visitor role, with very limited access to system 212.

In one embodiment, access rights, possibly together with one or more access periods indicating times when the access rights are valid (which may also be assigned/established by the second backend 218), may be stored by the second backend 218, e.g. within the connection management entries 219 or a database. That way the second backend 218 remains in control of checking whether or not control commands received from the controller, either via the first backend or directly, are in accordance with the access rights assigned to the controller or the user of the controller.

In another embodiment, access rights, possibly together with one or more access periods may be transferred from the second backend 218 to the first backend 208 and/or to the controller 206, e.g. in a manner how access credentials are transferred (described below). Such an embodiment could be advantageous if the controller is trusted to correctly check whether or not control commands are in accordance with the access rights assigned to the controller or the user of the controller. The second backend 218 may still perform certain access rights checks even if the controller has performed the same checks.

A person skilled in the art will easily recognize different manners for assigning/establishing access rights and periods for different users/controllers or groups of users/controllers, all of which manners are within the scope of the present invention.

Figure 2B:
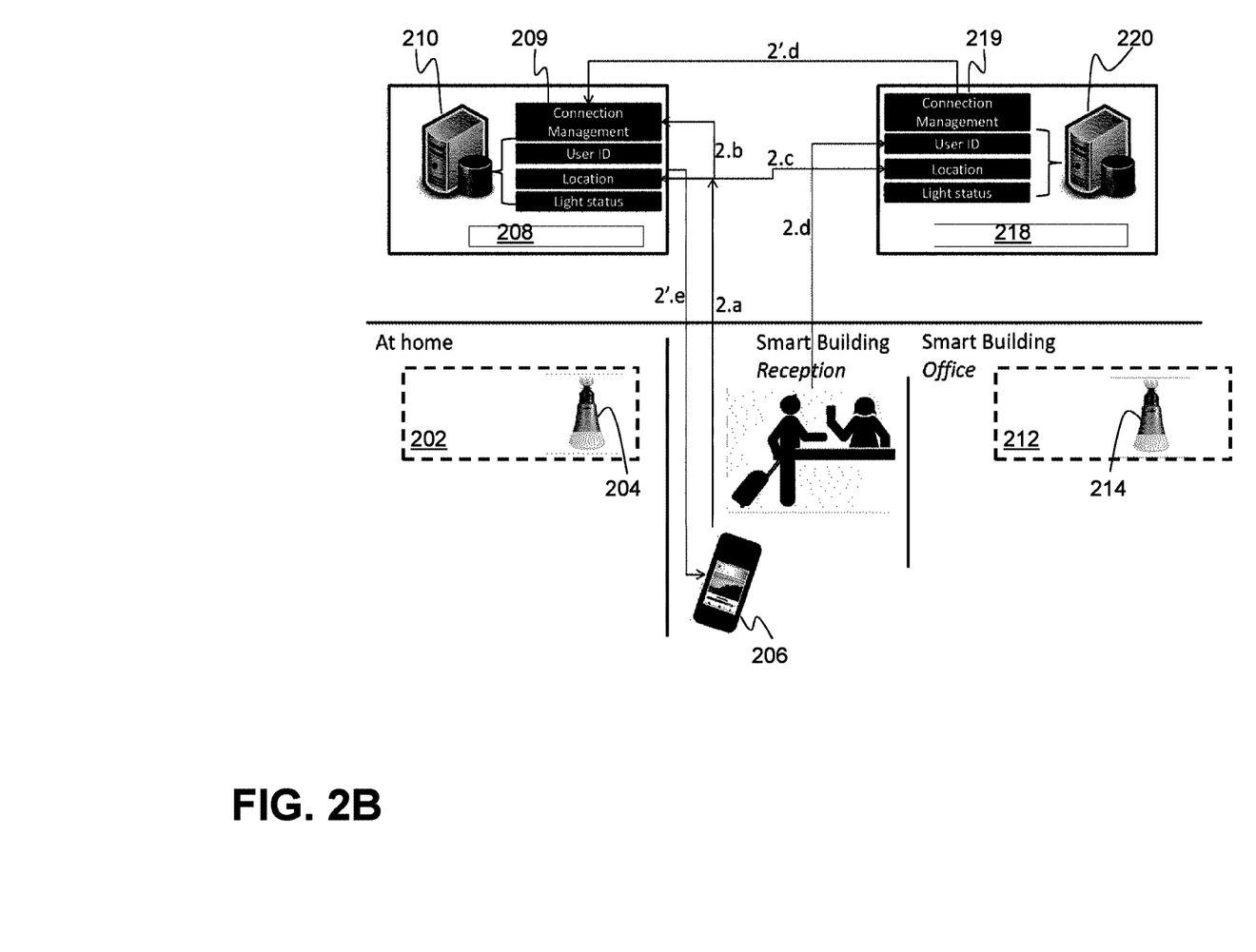
FIG. 2B is a schematic illustration of enabling a controller configured for controlling one or more controllable devices of a first system to control one or more controllable devices of a second system, according to another embodiment of the present invention.

FIG. 2B provides a schematic illustration of enabling the controller 206 configured for controlling the one or more controllable devices 204 of the first system 202 to control one or more controllable devices 214 of the second system 212, according to another embodiment of the present invention (the access credentials transfer embodiment). The elements in FIG. 2B shown with the same reference numerals as those in FIG. 2A, including steps 2.*a*-2.*d*, refer to elements analogous to those illustrated in FIG. 2A and, in the interests of brevity, their description is not repeated here. Examination of the differences between FIG. 2B and FIG. 2A reveals that, in comparison with FIG. 2A, FIG. 2B contains two further steps—steps 2'.*d* and 2'.*e*—performed after, or as a part of, the context matching carried out by the second backend 218 after the second backend received the information in steps 2.*c* and 2.*d*. Since the embodiment of FIG. 2B is a continuation of the embodiment shown in FIG. 2A, all of the discussions provided above for FIG. 2A are applicable to FIG. 2B as well. In the interests of brevity, these discussions are not repeated here.

In step 2'.*d* shown in FIG. 2B, the second backend 218 transfers access credentials to the first backend 208. The access credentials comprise information that allows the controller 206 to securely provide control commands for controlling the devices 214 to the second backend 218 directly, without the involvement of the first backend 208. Such access credentials could include information enabling authentication of the controller 206 with the second backend 218 and/or enabling the controller 206 to encrypt the control commands that the controller 206 will send to the second backend 218, such as e.g. one or more of authentication certificates or keys and one or more of encryption keys. The authentication certificates or keys could include e.g. the certificate of the second backend 218 or symmetric encryption keys and/or an authentication token signed by the second backend 218. The encryption keys could include e.g. symmetric encryption keys to be used to successfully authenticate the controller 206 to the second backend 218 during an initial secure communication establishment procedure.

The access credentials could also comprise an address at which the controller 206 can reach the second backend 218, such as e.g. IP address or a URL of the second backend.

In addition, e.g. as a part of step 2'.*d*, the second backend 218 could be configured to provide to the first backend 208 information that would enable the controller 206 to identify and/or individually address the one or more devices 214. For example, in case the devices 214 of the second system 212 are CL-enabled light sources, such information could comprise information that would allow the controller 206 to detect CL emitted by the light sources 214, such as e.g. an indication of the modulation scheme used by the devices 214 to emit CL, an indication of the format of the CL emitted by the different light sources 214, and/or an indication of when the light sources 214 will be emitting CL.

In step 2'.*e*, the first backend 208 further transfers the information received from the second backend 218 to the controller 206 (e.g. to the app enabling the functionality of the controller on a mobile phone of a user). With this information, the controller 206 can first, optionally, sense the devices 214 the user wants to control (e.g. by means of the devices 214 being CL-enabled devices) and, second, provide control commands to the second backend 218 in a secure manner based on the delivered authentication and/or encryption information and the address at which the controller 206 could reach the second backend 218. The second backend 218 could then process the control commands received from the controller 206 according to the access rights that the second backend 218 established for the user and/or for the controller 206 based on the context matching.

In some embodiments, provision of the control commands from the controller 206 to the second backend 218 in a secure manner may imply setting up of a secure channel between the controller 206 and the second backend 218, such as a Transport Layer Security (TLS) or a Datagram TLS (DTLS) session.

In other embodiments, the controller 206 could provide the control commands to the second backend 218 without having to set up a secure channel. This could be the case where the controller 206 is within a private network and after context matching, any user on the private network is allowed certain, typically restricted, access to the system 212.

Figure 3A:
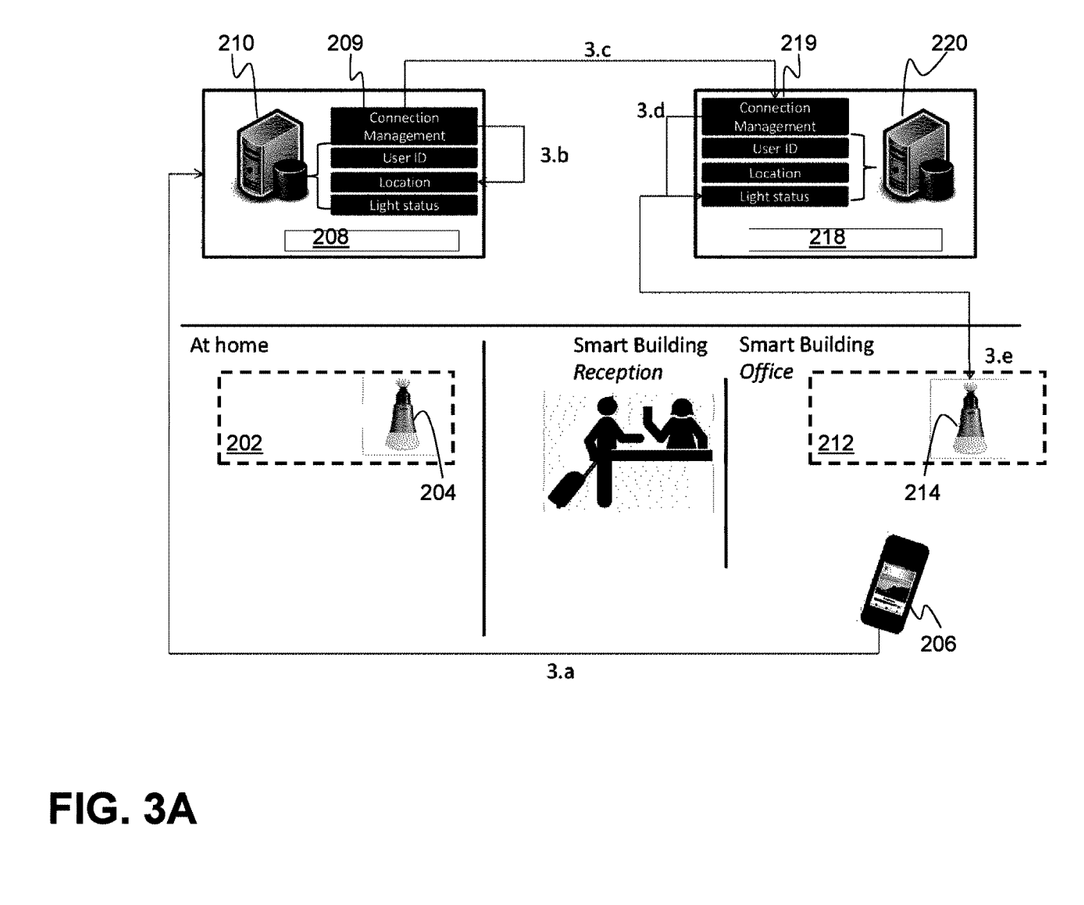
FIG. 3A is a schematic illustration of a controller configured for controlling one or more controllable devices of a first system controlling one or more controllable devices of a second system, according to one embodiment of the present invention.

FIG. 3A is a schematic illustration of how a controller configured according to an embodiment shown in FIG. 2A could control one or more controllable devices 214 of the second system 212, according to one embodiment of the present invention. The elements in FIG. 3A shown with the same reference numerals as those in FIG. 2A refer to the same elements as those illustrated in FIG. 2A and, in the interests of brevity, their description is not repeated here.

Since in FIG. 2A the transfer of access credentials did not take place, the controller 206 cannot establish a direct communication channel with the second backend 218. Therefore, when a user of the controller 206 wants to provide control commands for controlling one or more devices 214 (e.g. by providing user input to that effect via the GUI of the controller 206), the control commands are, first, provided from the controller 206 to the first backend 208, as shown in FIG. 3A with step 3.a. Some examples of control commands include dimming of lights, selection of presets such as projector mode, etc.

In step 3.b, the first backend 208 checks the current location of the user/controller by referring to the location information received by the first backend 208 from the controller in step 2.a and, preferably, stored in the database 210 to confirm that the location information for the controller 206 indicates that the controller 206 is within the infrastructure in which the second system 212 is deployed. Afterwards, the first backend 208 forwards the request to the second backend 218 (step 3.c). The second backend 218 then checks whether the request is in accordance with (i.e. allowed by) the access rights established for the controller 206 and/or the user of the controller, possibly in combination with access periods, and verifies whether the user is indeed within the area from which the devices 214 could be controlled (step 3.d) by referring to the location information received by the second backend 218 from the trusted source. If so, then the second backend 218 forwards the control command, or a derivation thereof suitable for interpretation by the devices 214, to the devices 214 that are to be controlled by the control command (step 3.e), possibly by first providing the control commands to the second system 212 which then distributes the commands to the relevant devices 214 (not shown in FIG. 3A).

Figure 3B:
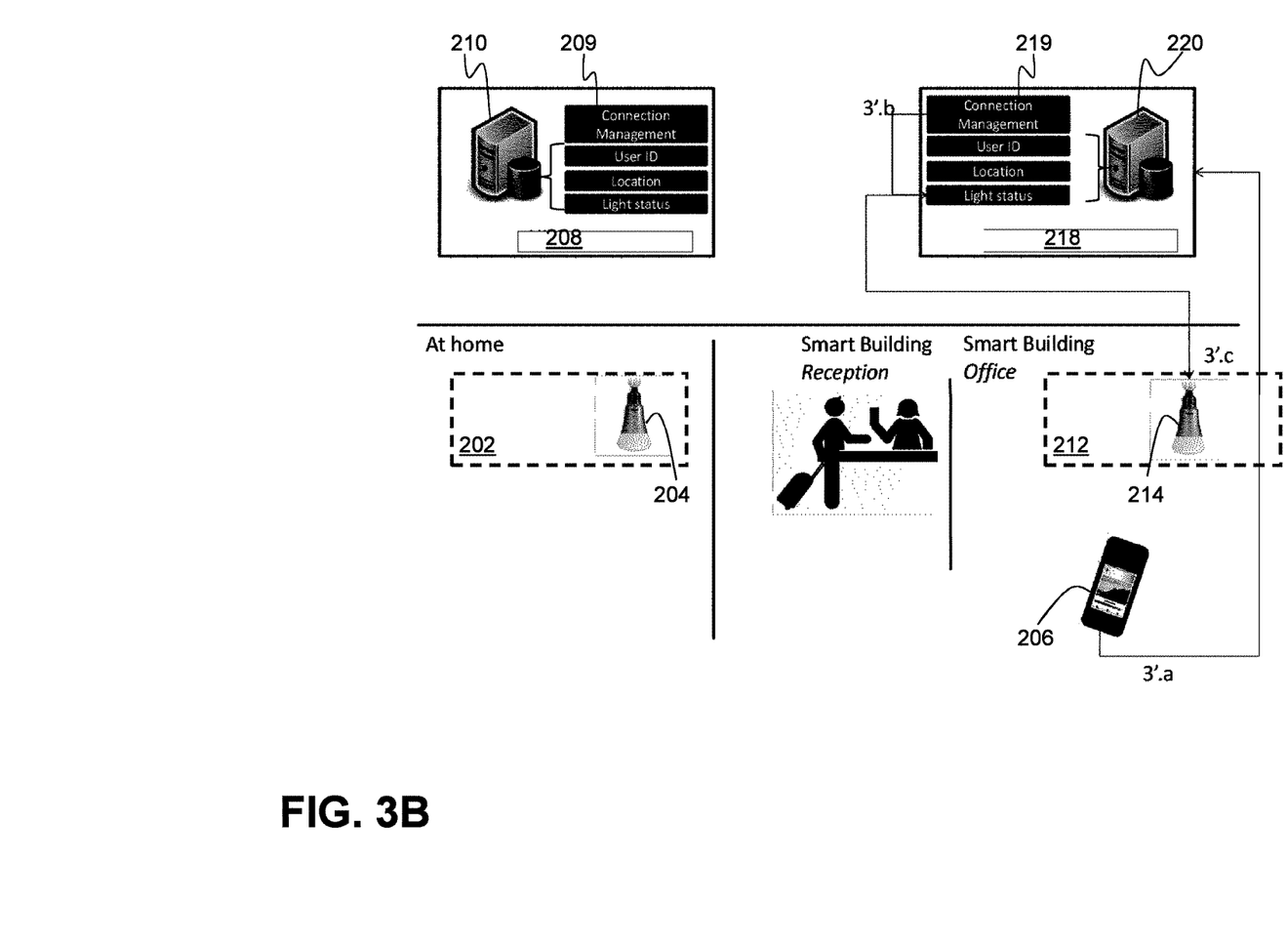
FIG. 3B is a schematic illustration of a controller configured for controlling one or more controllable devices of a first system controlling one or more controllable devices of a second system, according to another embodiment of the present invention.

FIG. 3B is a schematic illustration of how a controller configured according to an embodiment shown in FIG. 2B could control one or more controllable devices 214 of the second system 212, according to one embodiment of the present invention. The elements in FIG. 3B shown with the same reference numerals as those in FIG. 2B refer to the same elements as those illustrated in FIG. 2B and, in the interests of brevity, their description is not repeated here.

Since in FIG. 2B there was a transfer of access credentials from the second backend 218 to the controller 206, the controller 206 can communicate directly with the second backend 218. For example, if the controller 206 received, in step 2'.e access credentials that were provided by the second backend 218 in step 2'.d, the controller 206 can setup a secure channel directly with the second backend 218 using the credentials, such as e.g. symmetric keys, transferred to it. Alternately, controller 206 may not setup a secure channel if it is within a private network of the area in which system 212 is installed and instead be granted, after context matching, limited access to the system 212 based on its IP address within the network.

Therefore, when a user of the controller 206 wants to provide control commands for controlling one or more devices 214 (e.g. by providing user input to that effect via the GUI of the controller 206), the control commands may be provided from the controller 206 directly to the second backend 218, as shown in FIG. 3B with step 3'.a. Some examples of control commands include, again, dimming of lights, selection of presets such as projector mode, etc.

After receiving the control commands from the controller 206, the second backend 218 determines, in step 3'.b, whether the control commands are provided to the second backend in accordance with the access rights established for the controller and/or for the user controlling the controller 206.

Upon positive determination in step 3'.b, in step 3'.c the second backend 218 can provide the received control commands, or derivatives thereof, to the one or more devices 214 of the second system, possibly by first providing the control commands to the second system 212 which then distributes the commands to the relevant devices 214 (not shown in FIG. 3B).

Figure 4:
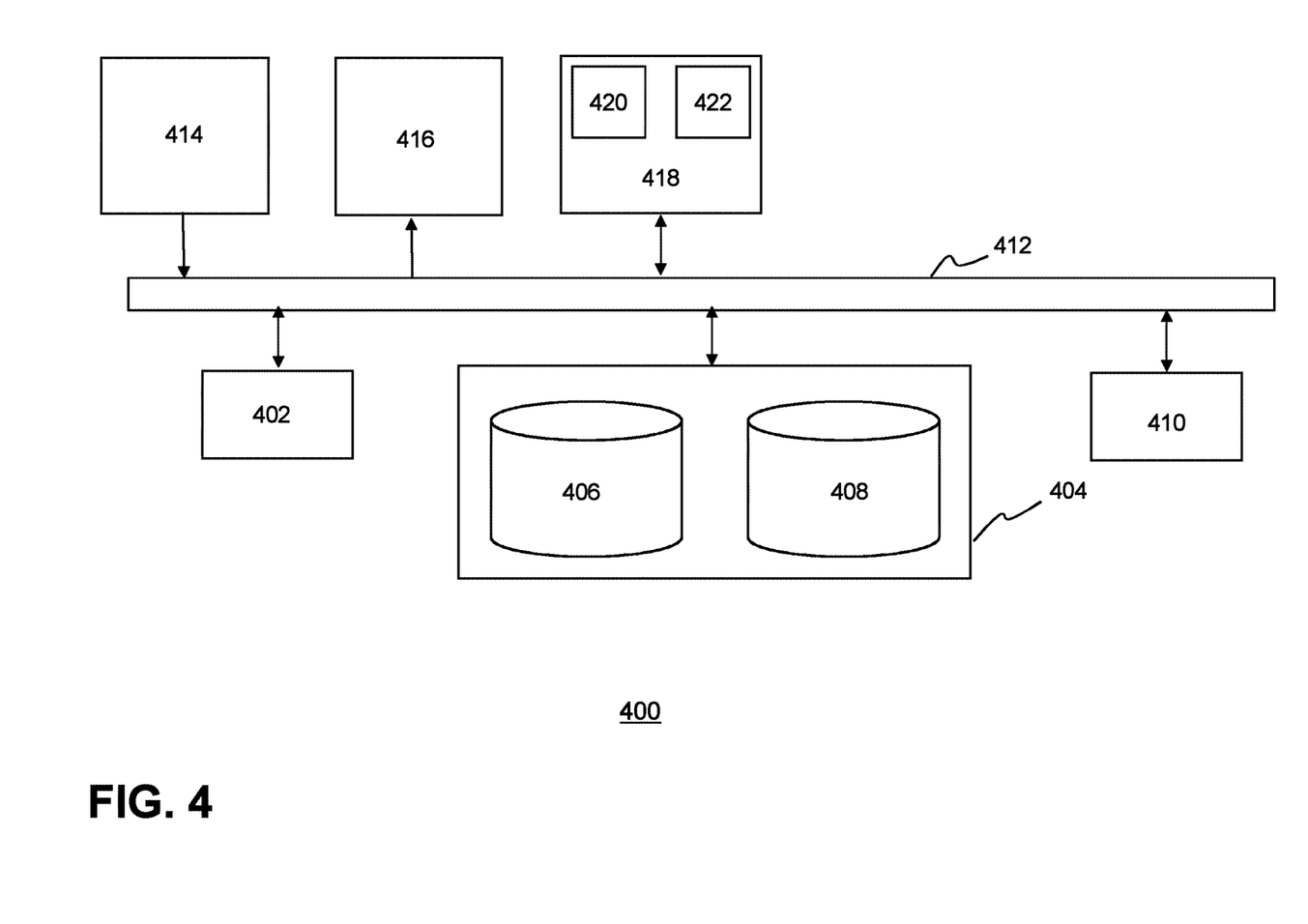
FIG. 4 is a schematic illustration of a data processing structure suitable for carrying out methods for enabling a controller configured for controlling one or more devices of a first system to control one or more devices of a second system, according to one embodiment of the present invention.

FIG. 4 is a schematic illustration of a data processing structure 400 suitable for carrying out methods for enabling the controller 206 configured for controlling the one or more devices 204 of the first system 202 via the first backend 208 to control the one or more devices 214 of the second system 212 via the second backend 218, according to one embodiment of the present invention. The data processing structure 400 could be implemented as the controller 206, the first backend 208, or the second backend 218, or as a part of those entities, by e.g. storing computer program code instructions that enable the functionality of these entities as described herein. In particular, if the data processing structure 400 is implemented as the controller 206, then, preferably, the data processing structure 400 is a portable electronic device such as e.g. a tablet computer, a laptop computer, a remote control, a smart phone, a PDA, or other handheld device.

As shown in FIG. 4, the data processing structure 400 may comprises at least one wireless receiver 402 for receiving data from other devices, memory elements 404, and one or more processors 410 coupled to the memory elements 404 through a system bus 412. As such, the data processing structure 400 may store program code within the memory elements 406. Further, the processor 410 may execute the program code accessed from memory elements 404 via the system bus 412. In one aspect, the data processing structure 400 may be implemented as a computer that is suitable for storing and/or executing program code. It should be appreciated, however, that the data processing structure 400 may be implemented in the form of any system including a processor and memory that is capable of performing the functions described within this specification.

The memory elements 404 may include one or more physical memory devices such as, for example, local memory 406 and one or more bulk storage devices 408. The local memory 406 may refer to random access memory or other non-persistent memory device(s) generally used during actual execution of the program code. The bulk storage devices 408 may be implemented as a hard drive or other persistent data storage device. The data processing structure 400 may also include one or more cache memories (not shown in FIG. 4) that provide temporary storage of at least some program code in order to reduce the number of times program code must be retrieved from bulk storage device during execution.

One or more output devices may also be included within or coupled to the data processing structure 400. At least one output device is a monitor or display 414 for displaying data to a user, preferably via a dedicated user interface. The display 414 may comprise a touch screen display, also sometimes referred to as a "touchscreen display" or "touch-sensitive display", configured to detect and respond to contact on or near the screen. Such a display may also be considered to be an input device because it allows a user to provide user input to the data processing structure 400 by making movements with a physical object such as e.g. a finger of the user or a stylus, on or near the touch screen display. Other examples of output devices which could, optionally, be also coupled to the data processing structure 400 include e.g. speakers, or the like.

The data processing structure 400 may further, optionally, include one or more peripheral input devices 416. Examples of the input devices 416 may include, but are not limited to, for example, a keyboard, a pointing device such as a mouse, or the like.

Input devices and/or output devices may be coupled to the data processing structure 400 either directly or through intervening I/O controllers.

A network adapter 418 may also be coupled to the data processing structure 400 to enable it to become coupled to other systems, computer systems, remote network devices, and/or remote storage devices through intervening private or public networks. The network adapter may, in particular, comprise a data receiver 420 for receiving data that is transmitted by said systems, devices and/or networks to said data and a data transmitter 422 for transmitting data to said systems, devices and/or networks. Modems, cable modems, and Ethernet cards are examples of different types of network adapter that may be used with the data processing structure 400.

The memory elements 404 may store an application (not shown in FIG. 4). It should be appreciated that the data processing structure 400 may further execute an operating system (not shown in FIG. 4) that can facilitate execution of the application. Application, being implemented in the form of executable program code, can be executed by the data processing structure 400, e.g., by the processor 410. Responsive to executing application, the data processing structure 400 may be configured to perform one or more method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the one or more processors 410, described herein.

While the forgoing is directed to embodiments of the present invention, other and further embodiments of the invention may be devised without departing from the basic scope thereof. For example, aspects of the present invention may be implemented in hardware or software or in a combination of hardware and software. Therefore, the scope of the present invention is determined by the claims that follow.

The invention claimed is:

1. A computer-implemented method for enabling a controller that is configured for controlling one or more devices of a first system via a first control system backend to also control one or more devices of a second system via a second control system backend, the method comprising:
   receiving, at the second control system backend, from the first control system backend, location information of the controller and credentials of the controller or/and of a user of the controller as available to the first control system backend;
   receiving, at the second control system backend, from a source trusted by the second control system backend, location information of the controller and credentials of the controller or/and of the user;
   performing, at the second control system backend, context matching to enable the controller to control the one or more devices of the second system, wherein the context matching comprises comparing the location information received from the first control system backend with the location information received from the source trusted by the second control system backend and by comparing the credentials received from the first control system backend with the credentials received from the source trusted by the second control system backend.

2. The computer-implemented method according to claim 1, wherein enabling the controller of the user to control the one or more devices of the second system comprises establishing access rights for the controller, the access rights identifying which devices of the one or more devices of the second system the controller is allowed to control.

3. The computer-implemented method according to claim 2, wherein enabling the controller of the user to control the one or more devices of the second system comprises establishing an access period, the access period identifying one or more time periods during which the controller is allowed to control the one or more devices of the second system.

4. The computer-implemented method according to claim 1, further comprising:
   receiving, at the second control system backend, from the first control system backend, a control command to control the one or more devices of the second system;
   determining, by the second control system backend, whether the user is within an infrastructure in which the second system is deployed;
   determining, by the second control system backend, whether the control command is allowed according to the outcome of the context matching; and
   upon positive determinations, the second control system backend providing the control command, or a derivative thereof, to the one or more devices of the second system.

5. The computer-implemented method according to claim 1, further comprising providing, from the second control system backend, to the first control system backend, access credentials enabling the controller to securely provide one or more control commands to the second control system backend, the one or more control commands being one or more commands for controlling the one or more devices of the second system.

6. The computer-implemented method according to claim 5, further comprising providing, from the second control system backend, to the first control system backend, information enabling the controller to identify and/or individually address the one or more devices of the second system.

7. The computer-implemented method according to claim 5, further comprising:
receiving, at the second control system backend, from the controller, a control command to control the one or more devices of the second system;
determining, by the second control system backend, whether the control command is in accordance with the access credentials provided by the second control system backend to the first control system backend; and
upon positive determination, the second control system backend providing the control command, or a derivative thereof, to the one or more devices of the second system.

8. A non-transitory computer readable medium comprising instructions which, when executed by one or more processors, perform steps for enabling a controller that is configured for controlling one or more devices of a first system via a first control system backend to also control one or more devices of a second system via a second control system backend, the steps comprising:
receiving, at the second control system backend, from the first control system backend, location information of the controller and credentials of the controller or/and of a user of the controller as available to the first control system backend;
receiving, at the second control system backend, from a source trusted by the second control system backend, location information of the controller and credentials of the controller or/and of the user;
performing, at the second control system backend, context matching to enable the controller to control the one or more devices of the second system, wherein the context matching comprises comparing the location information received from the first control system backend with the location information received from the source trusted by the second control system backend and by comparing the credentials received from the first control system backend with the credentials received from the source trusted by the second control system backend.

9. A second control system backend for enabling a controller configured for controlling, via a first control system backend, one or more devices of a first system to control one or more devices of a second system, the second control system backend configured to:
receive from the first control system backend location information of the controller and credentials of the controller or/and of a user of the controller as available to the first control system backend;
receive from a source trusted by the second control system backend location information of the controller and credentials of the controller or/and of the user; and
perform context matching to enable the controller to control the one or more devices of the second system, wherein the context matching comprises comparing the location information received from the first control system backend with the location information received from the source trusted by the second control system backend and by comparing the credentials received from the first control system backend with the credentials received from the source trusted by the second control system backend.

10. The first control system backend according to claim 9 for the first control system backend further configured to:
receive, from the second control system backend, information enabling the controller to identify and/or individually address the one or more devices of the second system; and
provide the information received from the second control system backend to the controller.

11. The second control system backend according to claim 9, wherein enabling the controller of the user to control the one or more devices of the second system comprises establishing access rights for the controller, the access rights identifying which devices of the one or more devices of the second system the controller is allowed to control.

12. The second control system backend according to claim 9, which is further configured to:
receive, from the first control system backend, a control command to control the one or more devices of the second system;
determine whether the user is within an infrastructure in which the second system is deployed;
determining whether the control command is allowed according to the outcome of the context matching; and
upon positive determinations, provide the control command, or a derivative thereof, to the one or more devices of the second system.

13. The second control system backend according to claim 9, which is further configured to provide, from the second control system backend, to the first control system backend, access credentials enabling the controller to securely provide one or more control commands to the second control system backend, the one or more control commands being one or more commands for controlling the one or more devices of the second system.

14. A system comprising the second control system backend of claim 9, and the first control system backend configured for controlling one or more devices of the first system, the first control system backend configured to:
receive, from the controller, the location information of the controller;
provide, to the second control system backend configured for controlling one or more devices of the second system, the local information of the controller and credentials of the user of the controller, so as to allow enable the second control system backend to perform said context matching.

15. A system according to claim 9, wherein the provision of the location information to the second control system backend enables the controller to provide the control command to control the one or more devices of the second system to the first control system backend, the first control system backend further configured to:
receive, from the controller, a control command to control the one or more devices of the second system;
determine whether the location information received from the controller indicates that the controller is within the infrastructure in which the second system is deployed; and
provide, to the second control system backend, the control command received from the controller.

16. A system comprising the second control system backend of claim 9 and the controller, the controller comprising one or more processors configured to:
control, via the first control system backend, the one or more devices of the first system;
provide the location information of the controller to the first control system backend, and provide a control command to control the one or more devices of the second system to either the first control system backend or the second control system backend.

* * * * *